F. W. C. VON KESSLER & A. F. MEDENWALD.
Blacking-Brushes.
No. 138,353. Patented April 29, 1873.
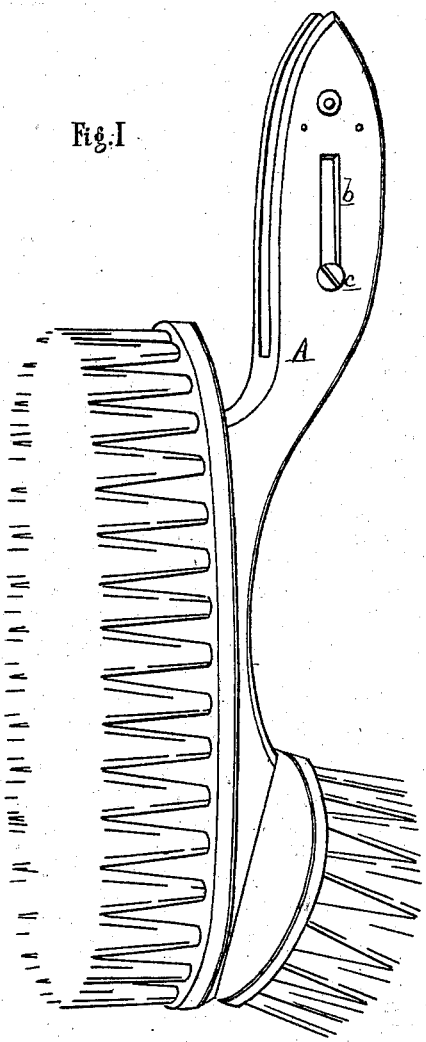
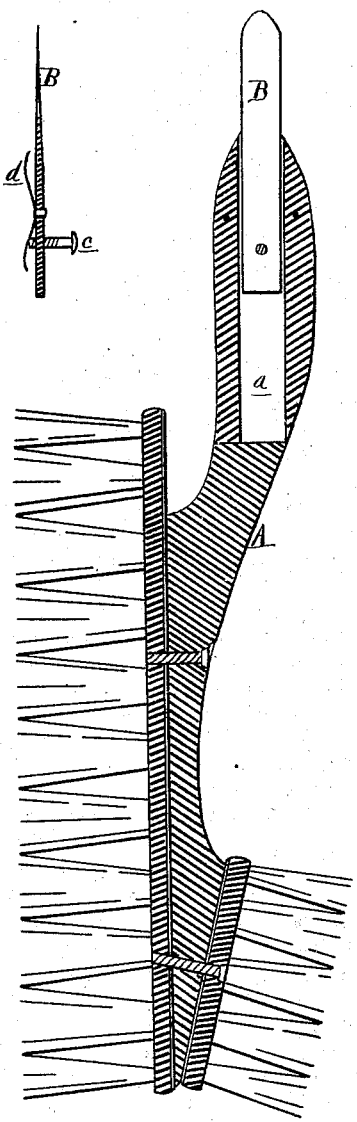

UNITED STATES PATENT OFFICE.

F. W. CARUS VON KESSLER AND AUGUST F. MEDENWALD, OF CHICAGO, ILLINOIS.

IMPROVEMENT IN BLACKING-BRUSHES.

Specification forming part of Letters Patent No. 138,353, dated April 29, 1873; application filed March 18, 1873.

*To all whom it may concern:*

Be it known that we, F. W. CARUS VON KESSLER and AUGUST F. MEDENWALD, of Chicago, in the county of Cook and State of Illinois, have invented a new and useful Improvement in Shoe-Brushes; and we do declare that the following is a true and accurate description thereof, reference being had to the accompanying drawing and to the letters of reference marked thereon and being a part of this specification, in which—

Figure 1 is a perspective view of our improved brush with the scraper retracted. Fig. 2 is a longitudinal section of the scraper. Fig. 3 is a longitudinal section of the brush with the scraper protruded.

Like letters refer to like parts in the several figures.

The nature of this invention relates to the combination with the handle of an ordinary shoe-brush of a metallic scraper for removing mud adhering to the shoe, so arranged as to slide or be folded into a recess in the handle when not in use. The invention consists in the construction and arrangement of a metallic blade or scraper with relation to the brush-handle, as more fully hereinafter set forth.

In the drawing, A represents the handle of a shoe-brush, in which there is formed a longitudinal cavity, $a$, formed by sawing a vertical slot in it, and securing wooden filling-pieces in the upper and lower edges. $b$ is a slot cut through one side of the handle into the cavity $a$. B is a metallic blade or scraper sliding in the cavity $a$, and is prevented from being entirely withdrawn by a stud, $c$, screwed into it, and projecting through the slot $b$, the said stud also serving as a handle, by means of which the scraper may be moved in and out. A curved steel spring, $d$, is riveted to one side of the scraper, and bears upon the wall of the cavity with pressure sufficient to keep the blade in whatever position it be left in.

As a convenient attachment to a shoe-brush the present device will be duly appreciated by every one having occasion to use it.

What we claim as our invention, and desire to secure by Letters Patent, is—

The combination with the shoe-brush handle A, having the cavity $a$ and slot $b$, of the the scraper B, provided with the stud $c$ and spring $d$, as and for the purpose set forth.

F. WM. CARUS VON KESSLER.
AUGUST F. MEDENWALD.

Witnesses:
WM. H. LOTZ,
EMIL FARKEY.